(12) United States Patent
Constance et al.

(10) Patent No.: US 9,144,365 B1
(45) Date of Patent: Sep. 29, 2015

(54) DISHWASHING SYSTEM

(75) Inventors: Alan Constance, Jeffersonville, IN (US);
Todd Fricke, New Albany, IN (US);
Michael A. Kurk, Georgetown, IN (US);
Samuel N. Logan, Greenville, IN (US);
Scott Moyers, New Albany, IN (US);
Tony Shulthise, Louisville, KY (US)

(73) Assignee: TECHSHOT, INC., Greenville, IN (US)

( * ) Notice: Subject to any disclaimer, the term of this patent is extended or adjusted under 35 U.S.C. 154(b) by 774 days.

(21) Appl. No.: 13/443,494

(22) Filed: Apr. 10, 2012

Related U.S. Application Data

(60) Provisional application No. 61/474,112, filed on Apr. 11, 2011.

(51) Int. Cl.
*B08B 3/00* (2006.01)
*A47L 15/24* (2006.01)
*B65G 37/00* (2006.01)

(52) U.S. Cl.
CPC ............... *A47L 15/24* (2013.01); *B65G 37/00* (2013.01)

(58) Field of Classification Search
None
See application file for complete search history.

(56) References Cited

U.S. PATENT DOCUMENTS

| | | | | |
|---|---|---|---|---|
| 3,122,235 A | * | 2/1964 | Meeker et al. | 198/794 |
| 4,274,886 A | * | 6/1981 | Noren | 134/25.2 |
| 4,561,904 A | * | 12/1985 | Eberhardt, Jr. | 134/18 |

* cited by examiner

*Primary Examiner* — Eric Golightly
(74) *Attorney, Agent, or Firm* — Middleton Reutlinger; Robert H. Eichenberger

(57) ABSTRACT

A system for feeding washing racks to an entrance of a washer, comprising: a directionally alternating transfer conveyor positioned at, and able to communicate said washing racks with, said entrance of said washer; said conveyor having a first receiving mode, a second receiving mode, and a discharge mode; and a pre-wash enclosure substantially surrounding said conveyor and including a first and second door, said first and said second door each actuable between an open position and a closed position; and a pre-wash selective water flow interior of said pre-wash enclosure and directed generally toward said conveyor.

9 Claims, 13 Drawing Sheets

DISHWASHING SYSTEM

CROSS-REFERENCE TO RELATED APPLICATIONS

This application claims the benefit of U.S. Provisional Application No. 61/474,112, filed Apr. 11, 2011, which is hereby incorporated by reference in its entirety.

STATEMENT REGARDING FEDERALLY SPONSORED RESEARCH AND DEVELOPMENT

This invention was made with government support under Contract N00024-09-C-4110 awarded by Naval Sea Systems Command. The government may have certain rights in the invention.

TECHNICAL FIELD

The present invention is directed generally to one or more aspects of a dishwashing system. More particularly, various inventive methods and apparatus disclosed herein relate to one or more aspects of systems for interfacing with a washer.

BACKGROUND

In circumstances where there are many occupants occupying a small space for extended periods of time, there is an increased need for daily operations to be performed in a smaller area than under normal circumstances. This need is especially noticeable onboard ships, such as United States Navy ships, on which many people are stationed for extended periods of time, up to several months. The high volume of dishware and silverware/flatware used onboard naval vessels, and under similar circumstances, may provide the desire to clean and sanitize this dishware and silverware/flatware quickly, while working within the space constraints of a ship.

SUMMARY

The present disclosure is directed toward one or more aspects of a dishwashing system. For example, methods and apparatus described herein may relate to one or more of a load rack, a queue conveyor, a silverware soaking station, a pre-wash station, a pre-wash popup conveyor, an auxiliary conveyor, an exit conveyor, and an exit popup conveyor.

Generally, in one aspect, a system for feeding washing racks to an entrance of a washer and receiving washing racks from an exit of a washer is provided. The system may include a first pop-up conveyor and a second pop-up conveyor. The first pop-up conveyor has a plurality of first rollers each at least selectively rotating about respective of first roller axes. The first roller axes are all oriented substantially parallel to one another. The first pop-up conveyor has a plurality of first rotating belts each at least selectively rotating about respective of first rotating belt axes. The first roller axes are all substantially perpendicular to the first rotating belt axes. The first rotating belts are adjustable between a first transferring position wherein the first rotating belts are positionally above the first rollers and a first non-transferring position wherein the first rotating belts are positionally below the first rollers. The second pop-up conveyor has a plurality of second rollers each at least selectively rotating about respective of second roller axes. The second roller axes are all oriented substantially parallel to one another. The second pop-up conveyor has a plurality of second rotating belts each at least selectively rotating about respective of second rotating belt axes. The second roller axes are all substantially perpendicular to the second rotating belt axes. The second rotating belts are adjustable between a second transferring position wherein the second rotating belts are positionally above the second rollers and a second non-transferring position wherein the second rotating belts are positionally below the second rollers. The first pop-up conveyor is positioned at, and able to communicate the washing racks with, one of the entrance of the washer and the exit of the washer and the second pop-up conveyor is positioned at, and able to communicate the washing racks with, the other of the entrance and the exit. The first pop-up roller axes and the second pop-up roller axes are substantially parallel to one another In some embodiments the first rollers are selectively driven to rotate about respective of the roller axes in a first rotational direction and in an opposite second rotational direction.

In some versions of those embodiments the first pop-up conveyor is at the entrance of the washer.

In some embodiments the first rollers are interposed between a silverware soaking station and an auxiliary conveyor.

In some versions of those embodiments the first rollers are selectively driven to rotate about respective of the roller axes in a first rotational direction when the washing racks are sensed originating from the silverware soaking station and driven to rotate in an opposite second rotational direction when the washing racks are sensed originating from the auxiliary conveyor.

In some embodiments the system further includes a pre-wash enclosure substantially surrounding the first pop-up conveyor and a pre-wash selective water flow interior of the pre-wash enclosure and directed generally toward the first pop-up conveyor, wherein the first pop-up conveyor is at the entrance of the washer.

In some versions of those embodiments the pre-wash enclosure includes at least one door actuable between an open position and a closed position. The door is in the open position at least when one of the washing racks is communicated to the first pop-up conveyor and is in the closed position at least when the washing rack is within the pre-wash enclosure and the water flow is activated.

Generally, in another aspect, a system for feeding washing racks to an entrance of a washer is provided. The system includes a directionally alternating transfer conveyor positioned at, and able to communicate the washing racks with, the entrance of the washer. The conveyor has a first receiving mode, a second receiving mode, and a discharge mode. In the first receiving mode the conveyor is transferringly driving in a first direction and in the second receiving mode the conveyor is transferringly driving in a second direction opposite the first direction. In the discharge mode the conveyor is transferringly driving in a third direction substantially perpendicular to the first direction and the second direction. The system also includes a pre-wash enclosure substantially surrounding the conveyor and including a first and second door. The first and the second door are each actuable between an open position and a closed position. A pre-wash selective water flow interior of the pre-wash enclosure is directed generally toward the conveyor. The first door is in the open position and the conveyor is in the first receiving mode at least when one of the washing racks is communicated to the conveyor in the first direction. The second door is in the open position and the conveyor is in the second receiving mode at least when one of the washing racks is communicated to the conveyor in the second direction. The first door and the second door are both in the closed position at least when one of the washing racks is within the pre-wash enclosure and the water flow is activated.

In some embodiments the system further includes a silverware soaking station and an auxiliary conveyor. The conveyor is optionally interposed between the silverware soaking station and the auxiliary conveyor. In some versions of those embodiments the system further includes an actuable flipper arm movable between a retracted flipper position wherein the flipper arm is in non-interference with the silverware soaking station and an extended flipper position wherein the flipper arm is atop the silverware soaking station and more proximal the conveyor than it is in the retracted flipper position. In some versions of those embodiments the system further includes an actuable second flipper arm movable between a second retracted flipper position wherein the second flipper arm is in non-interference with the auxiliary conveyor and a second extended flipper position wherein the second flipper arm is atop the auxiliary conveyor and more proximal the conveyor than it is in the second retracted flipper position. The silverware soaking station may include a soaking tank and a roller platform movable between a transfer platform position substantially coplanar with the conveyor and a soaking platform position recessed into the soak tank and positionally below the transfer platform position. In some versions of those embodiments the system further includes an actuable flipper arm movable between a retracted flipper position wherein the flipper arm is in non-interference with the silverware soaking station and an extended flipper position wherein the flipper arm is atop the silverware soaking station and more proximal the conveyor then it is in the retracted flipper position. In some versions of those embodiments the system further includes a light curtain adjacent the silverware soaking station, the light curtain sensing passes of objects therethrough when the roller platform is in the soaking platform position. The platform may move from the soaking platform position to the transfer platform position after sensing of a predetermined number of object passes by the light curtain when the roller platform is in the soaking platform position.

The conveyor may optionally include a plurality of rollers rotationally driving selectively in the first direction and selectively in the second direction, and a plurality of first rotating belts rotationally driving selectively in the third direction, wherein the rotating belts are adjustable between a transferring position positionally above the rollers and a non-transferring position positionally below the rollers.

Generally, in another aspect, a method of feeding washing racks to an entrance of a washer is provided and includes the steps of: conveying a silverware washing rack to a silverware soaking station; lowering the silverware washing rack into a soak tank of the silverware soaking station; filling the soak tank with a soaking solution; sensing passes of objects from a silverware user loading area toward the soak tank; determining, based on the step of sensing passes of objects, when a threshold amount of silverware is in the silverware washing rack in the silverware soaking station; raising the silverware washing rack after determining the threshold amount of silverware is in the silverware washing rack; and transferring the silverware washing rack downstream into the entrance of the washer after the step of raising the silverware washing rack after determining the threshold amount of silverware is in the silverware washing rack.

In some embodiments the step of transferring the silverware washing rack downstream into the entrance of the washer includes transferring the silverware washing rack to a pre-wash area from a first direction and transferring the silverware washing rack from the pre-wash area directly to the entrance of the washer in a second direction generally perpendicular to the first direction. In some versions of those embodiments the method further includes the steps of opening a door providing access to the pre-wash area from the silverware soaking station prior to transferring the silverware washing rack to the pre-wash area and closing the door after transferring the silverware washing rack to the pre-wash area. In some versions of those embodiments the method further includes the step of directing a pre-wash spray toward the silverware washing rack after closing the door after transferring the silverware washing rack to the pre-wash area and prior to transferring the silverware washing rack from the pre-wash area directly to the entrance of the washer.

The term "controller" is used herein generally to describe various apparatus relating to the operation of one or more dishwashing system components. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed herein are contemplated as being part of the inventive subject matter disclosed herein.

BRIEF DESCRIPTION OF THE ILLUSTRATIONS

DETAILED DESCRIPTION

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, various embodiments of the approach disclosed herein are particularly suited for utilization in combination with a galley style dishwasher. Accordingly, for illustrative purposes, the aspects of a dishwashing system are discussed in conjunction with such a galley style dishwasher. However, other configurations and applications are contemplated without deviating from the scope or spirit of the claimed invention. For example, one or more aspects may be implemented in combination with other washers, such as other types of dishwashers. Also, for example, one or more aspects may be implemented to provide for the delivery of and/or removal of alternative and/or additional materials besides flatware, dishware, etc. from a washer.

Figure 1:
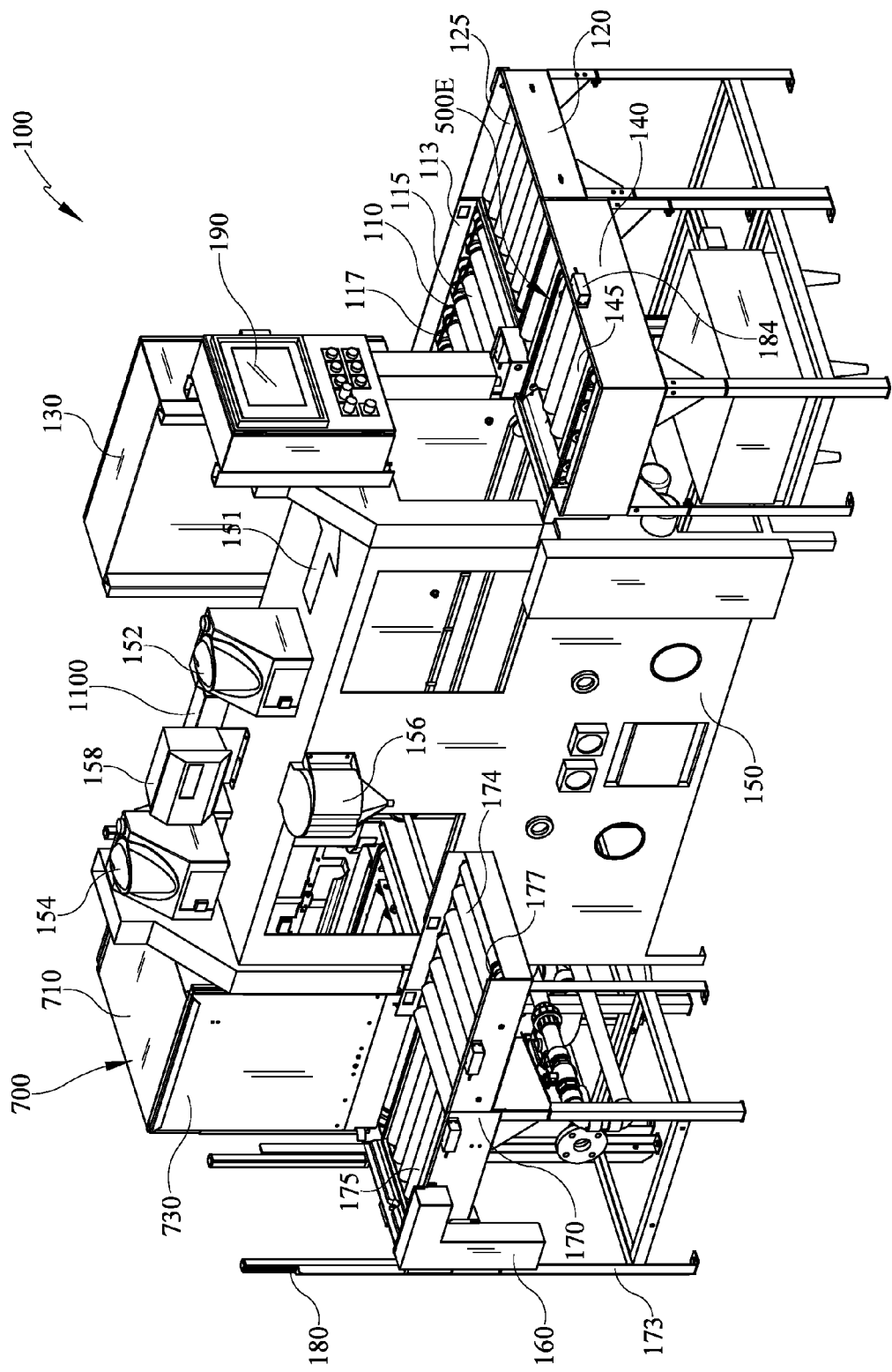
FIG. 1 is a front-right perspective view of an embodiment of the dishwashing system.

FIG. 1 is a front-right perspective view of an embodiment of the dishwashing system 100. This view illustrates embodiments of a load rack 120, a queue conveyor 110, a pre-wash station 700 (see FIG. 7), an auxiliary conveyor 170, a dishwasher 150, an exit conveyor 140, an exit popup conveyor 500E (see FIG. 5), a load rack 120, a control enclosure 130, and a graphical user interface (GUI) 190. This view illustrates the queue conveyor 110 having a queue frame 113, a plurality of queue rollers 115, and a plurality of queue drive bands 117. Each of the plurality of queue rollers 115 may, as illustrated, be affixed substantially parallel to the other of the plurality of queue rollers 115. The queue conveyor rollers 115 may be attached to and/or supported by the queue frame 113. The queue conveyor rollers 115 may be rotationally affixed to one or more additional queue conveyor rollers 115 by a queue drive band 117. The queue drive band 117 may be used to transfer rotational power from one or more queue conveyor rollers 115 to one or more additional queue conveyor rollers 115. In this way, as few as one queue conveyor roller 115 may cause the powering of substantially more of the queue conveyor rollers 115. This may result in a relatively efficient way of transferring a dishwasher rack the length of the queue conveyor 110. The queue conveyor rollers 115 may be substantially planar and stand at a first conveyor height above the ground, floor, or other supporting surface. The load rack rollers 125 may also stand at the first conveyor height, such that a dishwasher rack may easily be transferred from the load rack 120 to the queue conveyor 110.

Figure 7:
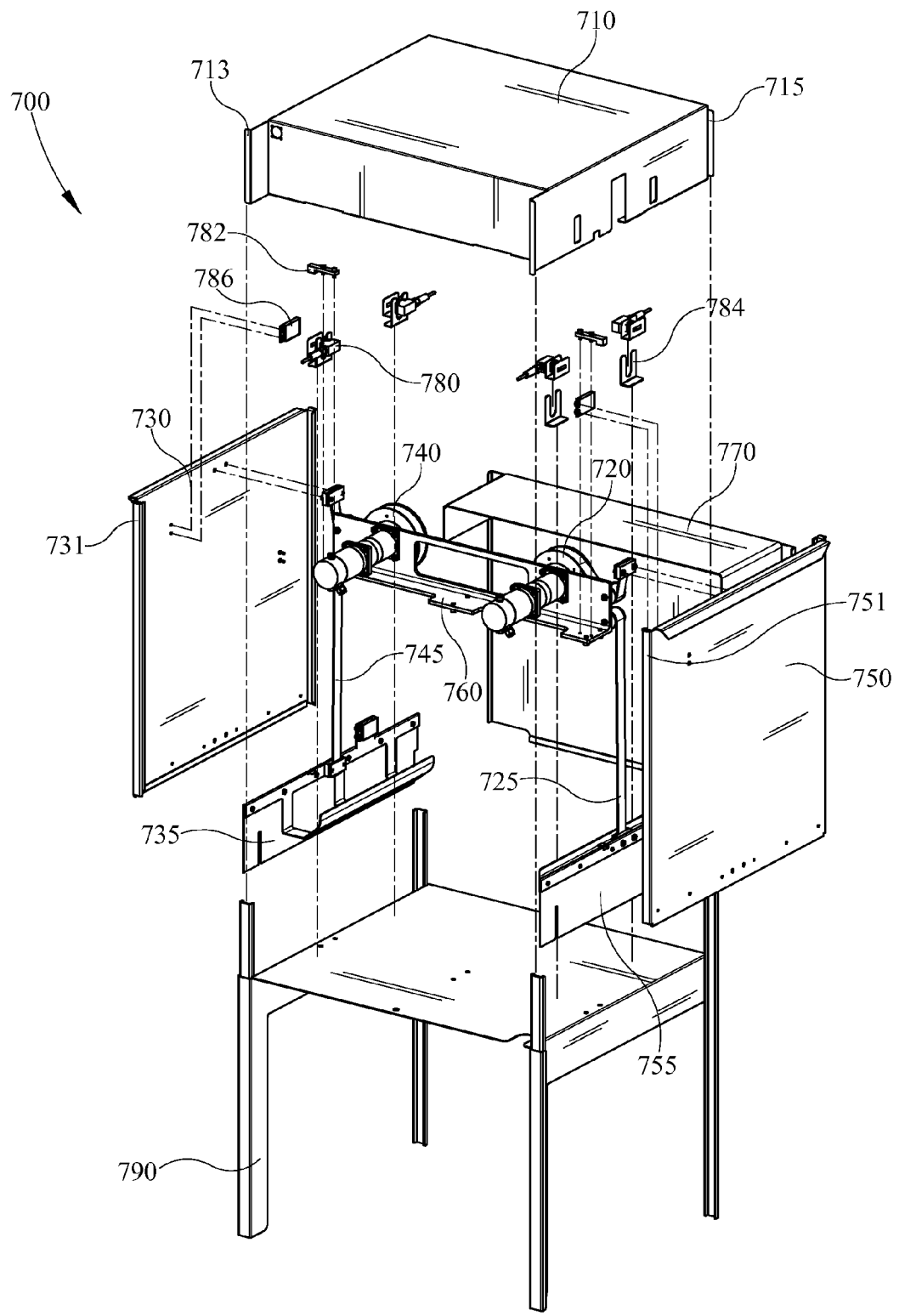
FIG. 7 is an exploded perspective view of an embodiment of the pre-wash station.
Figure 8:
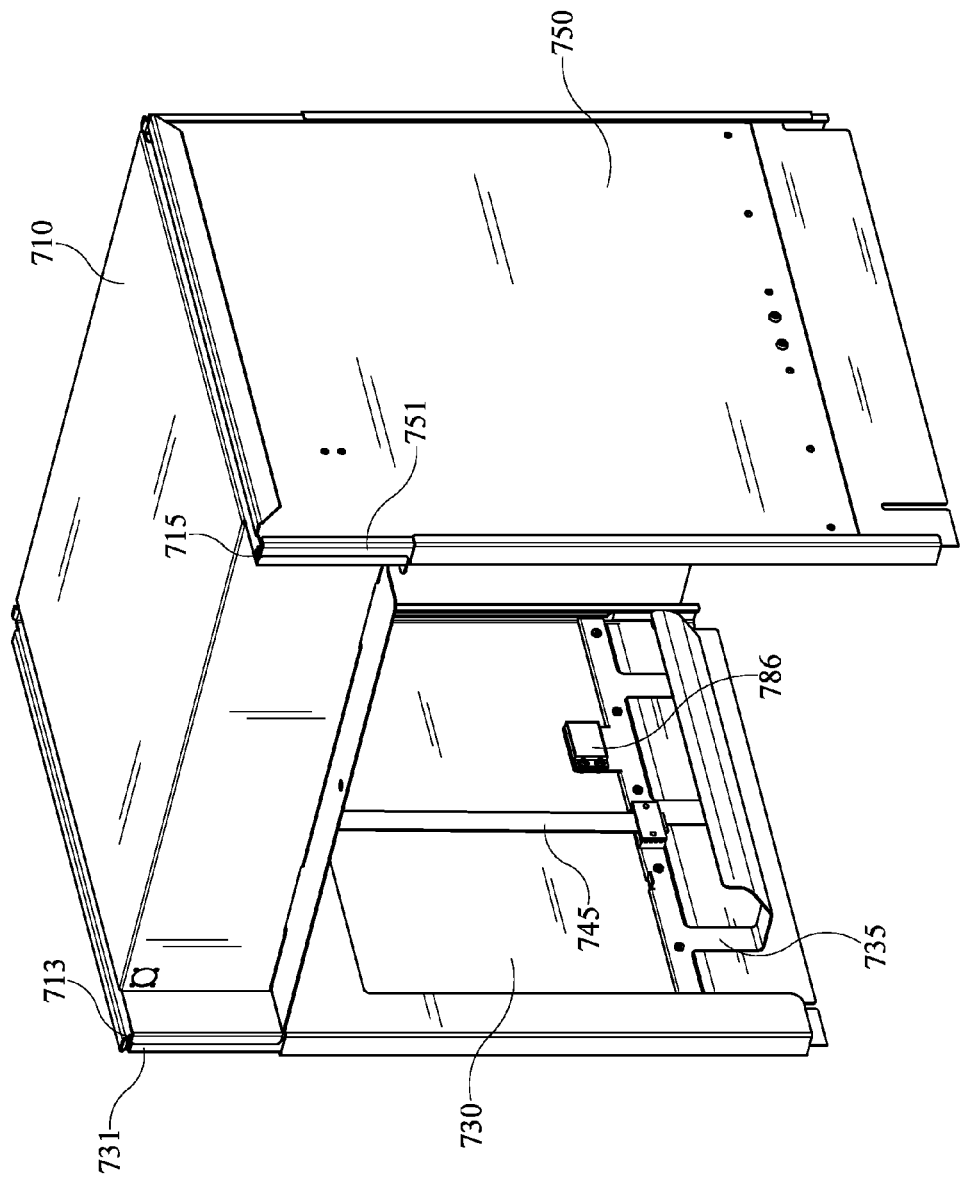
FIG. 8 is a perspective view of an embodiment of the assembled pre-wash station.
Figure 9:
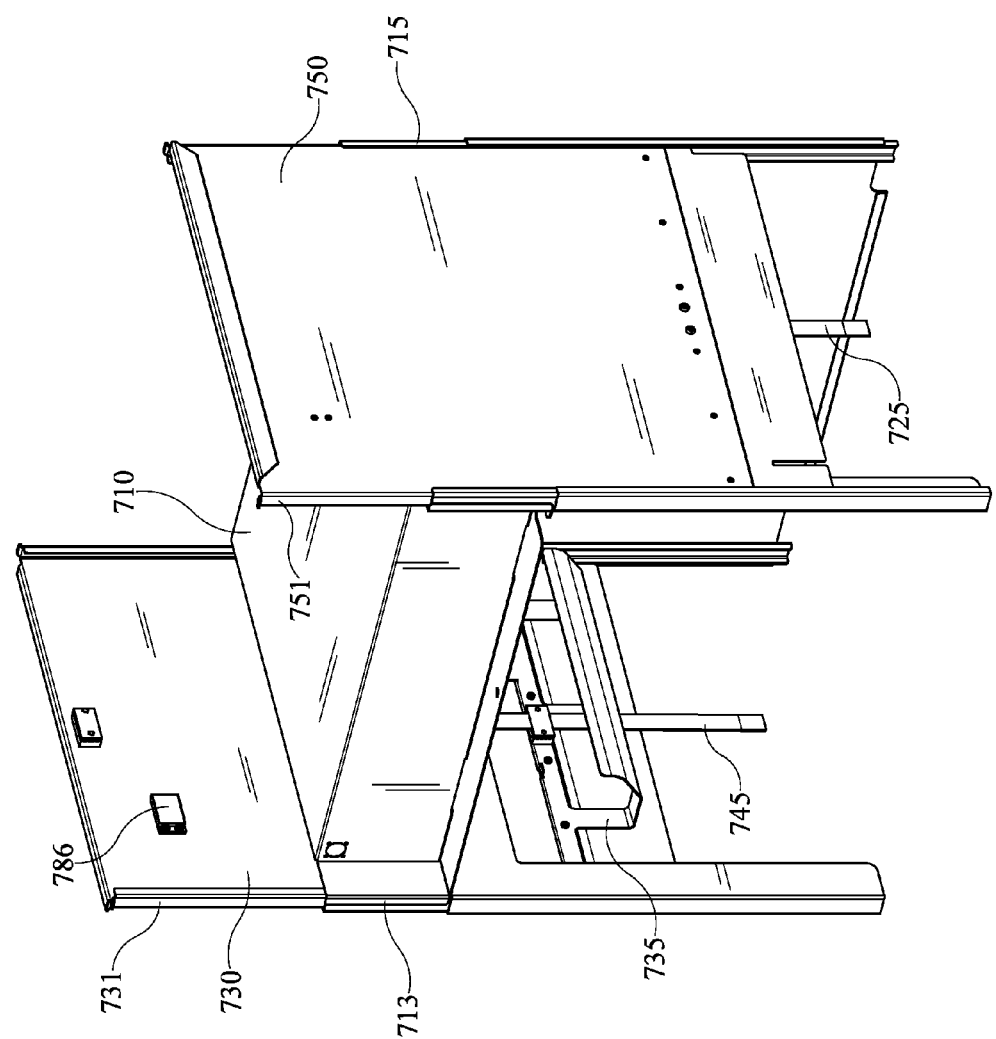
FIG. 9 is a perspective view of an embodiment of the pre-wash station illustrating an embodiment of the doors partially raised.

FIG. 1 also illustrates an embodiment of the pre-wash station 700 having a hood 710 and an auxiliary side door 730. The auxiliary side door 730 may raise and lower relative to the hood 710, as FIGS. 7-9 illustrate in more detail. This view illustrates the auxiliary conveyor 170 having an auxiliary frame 173, a plurality of auxiliary powered rollers 174, a plurality of auxiliary rollers 175, and a plurality of auxiliary drive bands 177. The auxiliary powered rollers 174 and auxiliary rollers may stand at the first conveyor height, substantially the same as the queue conveyor rollers 115 and the load rack rollers 125. This view also illustrates the auxiliary conveyor 170 having attached thereto an auxiliary flipper motor 160 and an auxiliary light curtain 180. The auxiliary flipper motor 160 may be used to transfer a dishwasher rack in a substantially transverse direction to the direction of travel caused by the auxiliary powered rollers 174. In this way, the dishwasher rack may be transferred from the auxiliary conveyor 170, through the raised auxiliary side door 730, and into the pre-wash station 700. This view illustrates the dishwasher 150 having attached thereto a rinse aid dispenser 152, a silverware soaking solution dispenser 154, a detergent dispenser 156, and a dispenser controller 158. This view also illustrates the dishwasher 150 having a direction of operation arrow 151 attached thereto. While it is understood that any of a variety of different types of dishwasher may be utilized, or a dishwasher could be specially designed and/or built for use in this dishwashing system, in some implementations the dishwasher may be a galley style dishwasher. In some versions of those implementations the dishwasher may be a GALLEYMASTER 250 dishwasher available from Insinger Machine Company of Philadelphia, Pa. FIG. 1 illustrates the exit conveyor 140 having a plurality of exit rollers 145 and an exit popup conveyor 500E mated thereto. In some embodiments, it may be desirable that the conveyor within the dishwasher 150 is elevated slightly above the adjacent pre-wash station conveyor rollers 705 and the adjacent exit conveyor rollers 145 and that the conveyor within the dishwasher stand at substantially the same height as the top face 529, 539 of the popup conveyor 500E, 500P, respectively. In this illustration, popup conveyor 500E is in a raised position, extending above the exit conveyor rollers 145. This view illustrates the load rack 120 having a plurality of load rack rollers 125. FIG. 1 illustrates an embodiment of an occupancy switch 184 that may be used to detect the presence of a dishwasher rack and may subsequently relay a signal to controller, such as a controller within the control enclosure 130. Thus, the dishwashing system 100 may be notified when an object, such as a dishwasher rack, is occupying an area adjacent to the occupancy switch 184.

Figure 2:
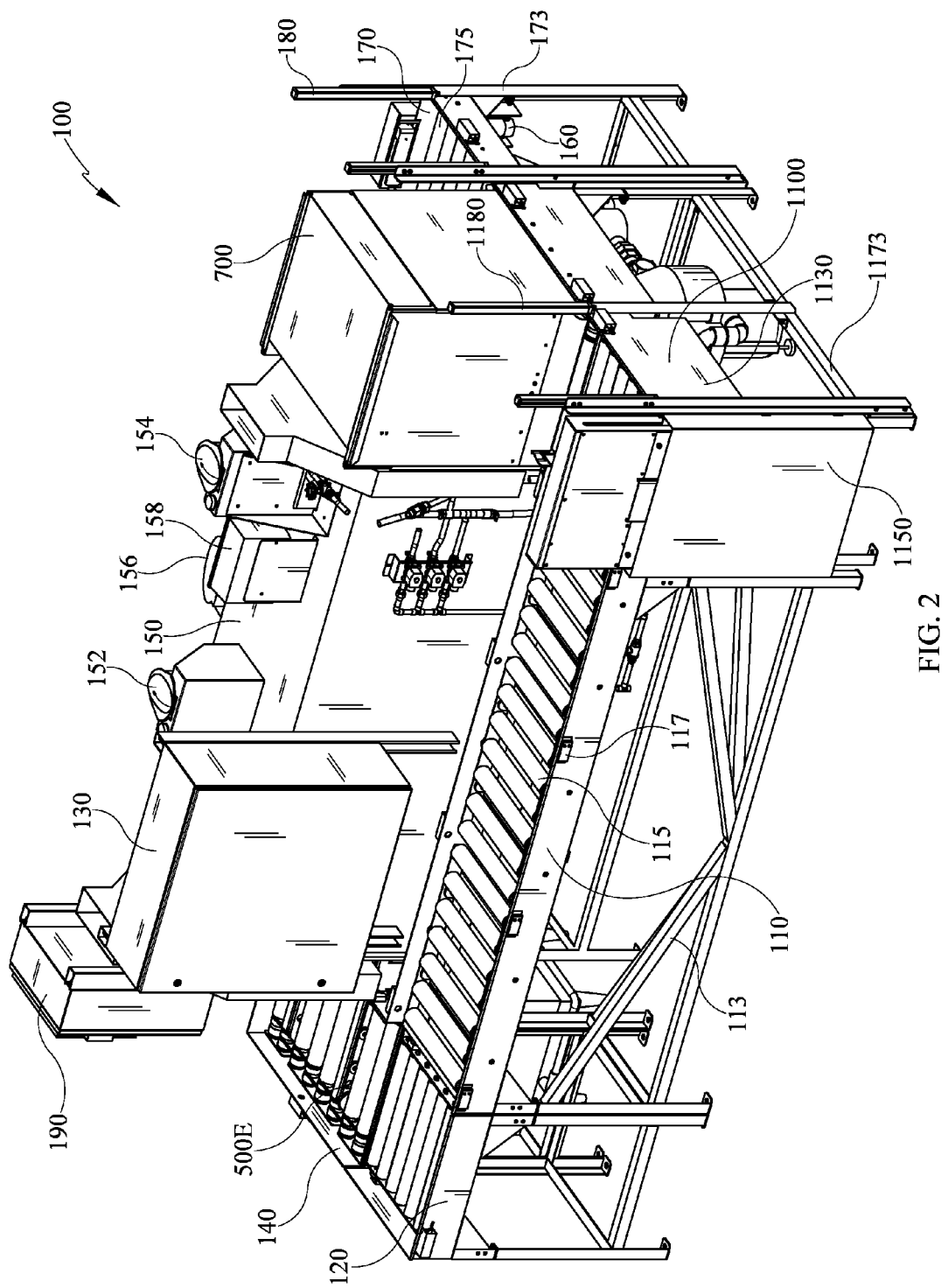
FIG. 2 is a rear-left perspective view of an embodiment of the dishwashing system.

Referring now to FIG. 2, an illustration of a rear-left perspective view of an embodiment of the dishwashing system is provided. This view illustrates embodiments of the load rack 120, the queue conveyor 110, the silverware soaking station 1100 (see FIGS. 11-13 for more detail regarding the silverware soaking station 1100), the auxiliary conveyor 170, the pre-wash station 700, the dishwasher 150, the exit conveyor 140, and the exit popup conveyor 500E. FIG. 2 further illustrates this embodiment of the silverware soaking station 1100 as having a soak tank 1130 and a silverware soaking station elevator 1150. FIG. 2 also illustrates the silverware soaking station 1100 as being supported by a silverware soaking station frame 1173. FIG. 2 also illustrates the embodiment of the control enclosure 130 and the GUI 190 illustrated in FIG. 1, but from a different perspective as described above.

Figure 3:
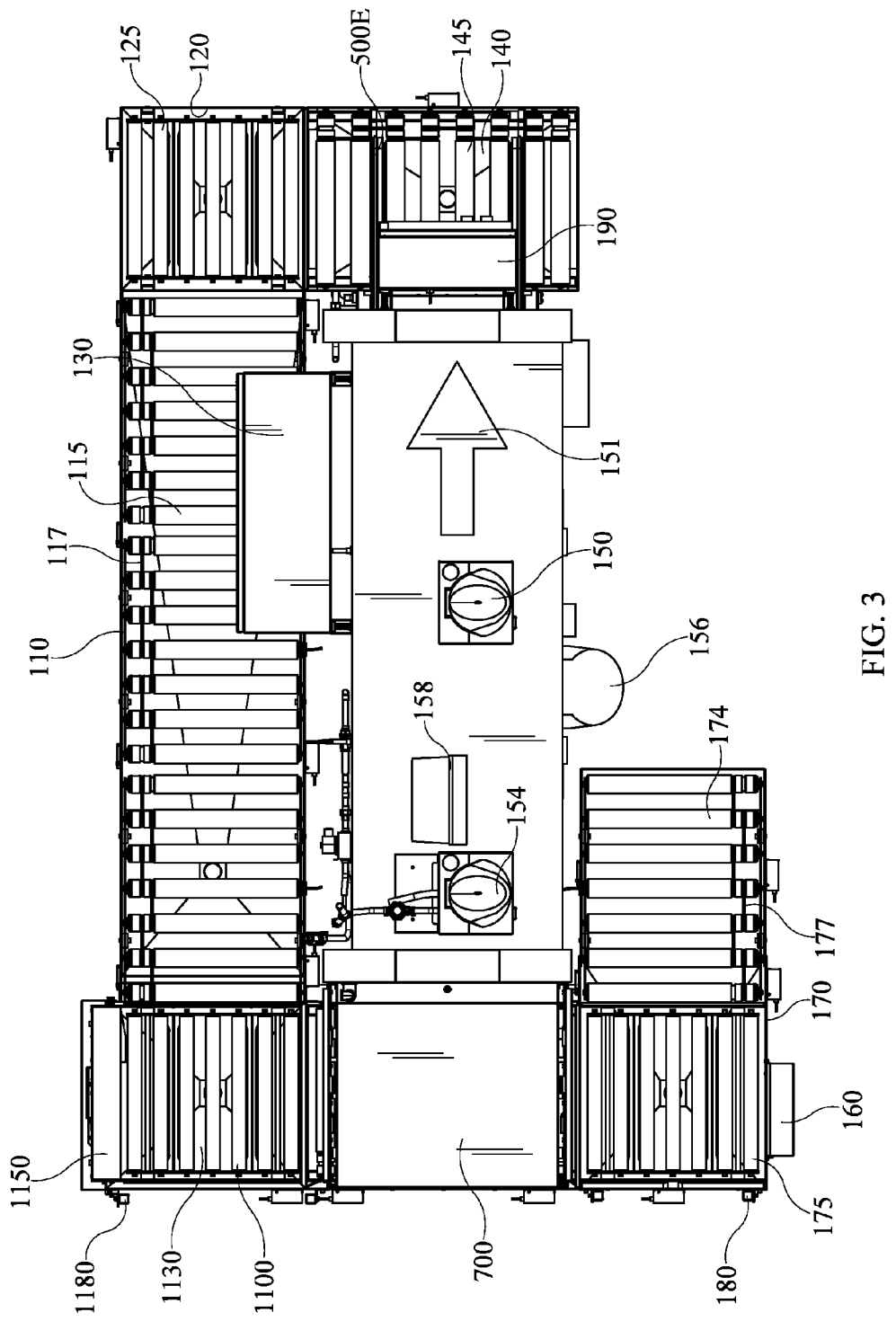
FIG. 3 is a top view of an embodiment of the dishwashing system.
Figure 4:
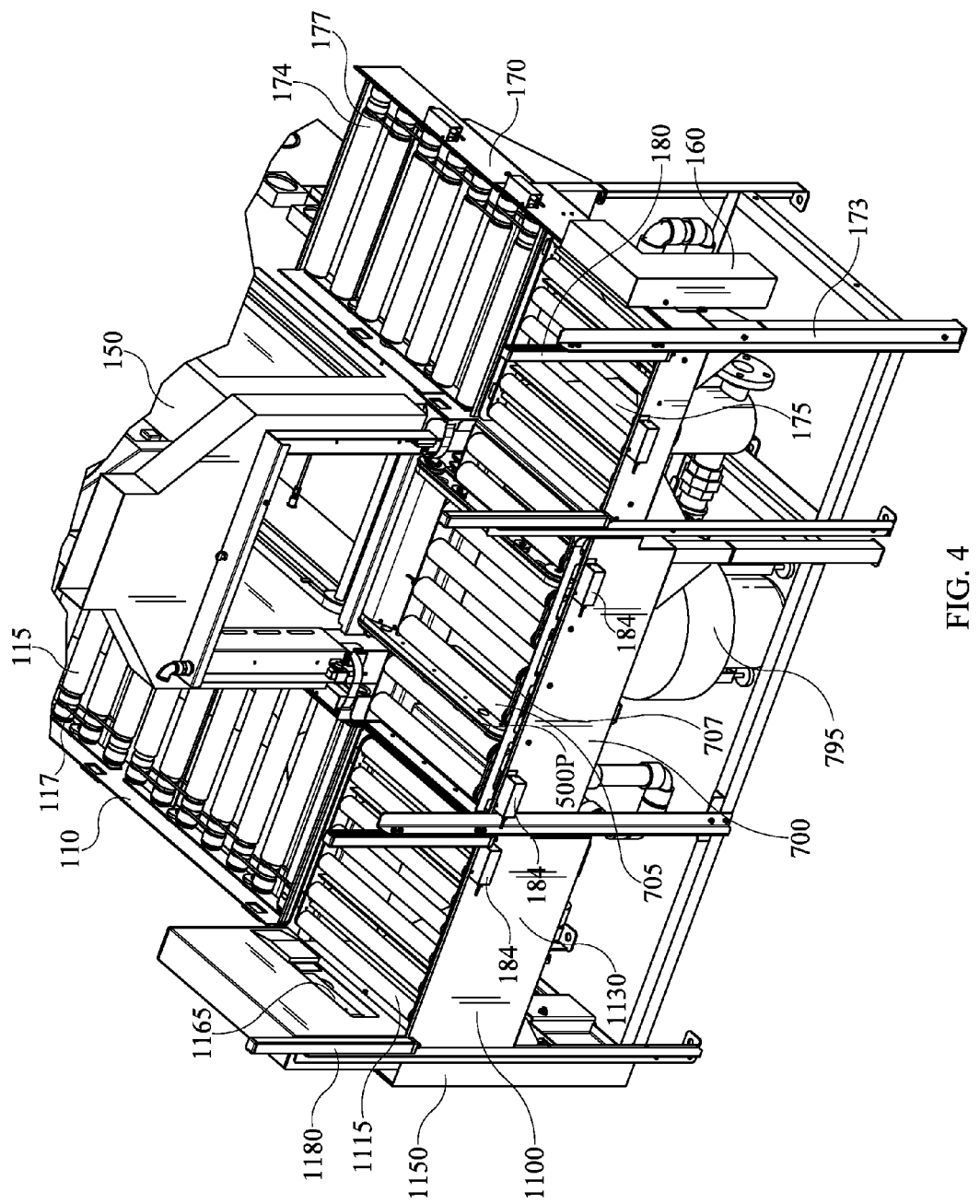
FIG. 4 is a front-left perspective view of an embodiment of a portion of the dishwashing system, focusing on an illustration of an embodiment of the silverware soaking station and an embodiment of the pre-wash station conveyor.

Referring now to FIG. 3, an illustration of a top view of the embodiment of the dishwashing system illustrated in FIGS. 1 and 2 is provided. FIG. 3 illustrates many of the features illustrated in FIG. 1 and/or FIG. 2, including the load rack 120, the queue conveyor 110, the silverware soaking station (SSS) 1100, the pre-wash station 700, the auxiliary conveyor 170, the dishwasher 150, the exit conveyor 140, and the exit popup conveyor 500E. FIG. 4 is an illustration of a front-left perspective view of an embodiment of a portion of the dishwashing system, focusing on an illustration of an embodiment of the silverware soaking station and an embodiment of the pre-wash station conveyor. FIG. 4 illustrates the embodiment of this portion of the dishwashing system 100 having the pre-wash station 700 without the hood 710, auxiliary side door 730, or other components that prevent view of the pre-wash conveyor rollers 705, the pre-wash conveyor drive bands 707, a garbage grinder 795, and/or the pre-wash popup conveyor 500P.

FIG. 4 illustrates the embodiment of the queue conveyor 110, the silverware soaking station (SSS) 1100, the pre-wash station 700, the auxiliary conveyor 170, and the dishwasher 150 illustrated in FIGS. 1-3. The embodiment illustrated in FIG. 4 contains pre-wash conveyor rollers 705 that may be powered directly by a motor or indirectly via the pre-wash conveyor drive bands 707. The pre-wash conveyor drive bands 707 may allow transfer of rotational power from a driven pre-wash conveyor roller 705 to another pre-wash conveyor roller 705. In this embodiment, the source of rotational power for the pre-wash conveyor rollers 705 may be capable of articulating in at least two, opposite directions, thereby causing transfer of a dishwasher rack from the silverware soaking station 1100 and/or the auxiliary conveyor 170. One or more occupancy switches 184 may be used to notify the dishwashing system 100 when the silverware soaking station 1100 and/or the pre-wash station 700 is occupied by a dishwasher rack or other object, as illustrated in FIG. 4. The notification of occupancy provided by the occupancy switches 184 may be used to activate the pre-wash popup conveyor 500P, so that the pre-wash popup conveyor 500P extends upwards to lift the occupying dishwasher rack and the pre-wash popup conveyor 500P may be activated to transfer the dishwasher rack into the dishwasher 150. The garbage grinder 795 may be operatively attached to a sink or basin of the pre-wash station 700 to grind and discharge food or other particulates that may be removed from the dishware, silverware, or other objects caused to enter the pre-wash station 700. FIG. 4 illustrates an embodiment of the SSS 1100 having a soak tank 1130 located below a plurality of SSS rollers 1115, a SSS elevator 1150, an SSS flipper 1165, and an SSS light curtain 1180. The SSS rollers 1115 may be substantially perpendicular to, and/or coplanar with, the queue conveyor rollers 115 as illustrated in FIG. 4. The SSS rollers 1115 may be attached to the SSS elevator 1150 so that a dishwasher rack may be lowered into the soak tank 1130 as desired, and as controlled by the dishwashing system 100. The SSS 1100 may have one or more occupancy switches 184 located adjacent to the SSS 1100 to notify the dishwashing system 100 of the presence of a dishwasher rack or other object. The SSS 1100 may contain a flipper 1165 used to transfer the dishwasher rack in a transverse direction to the direction of travel along the queue conveyor 110 and into the pre-wash station 700. By using the flipper 1165, the SSS rollers 1115 may optionally be unpowered.

Figure 5:
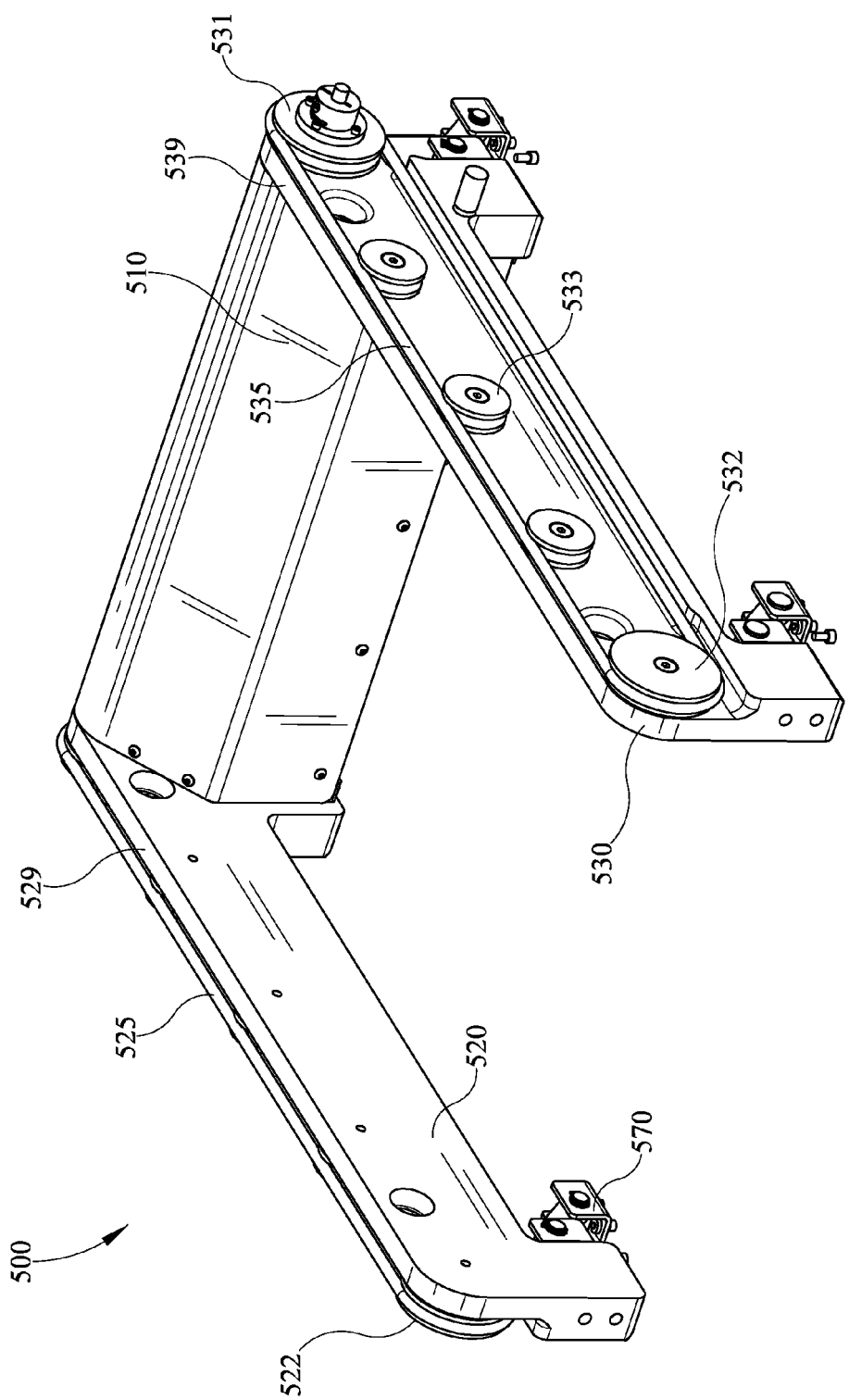
FIG. 5 is a perspective view of an embodiment of the popup conveyor.
Figure 6:
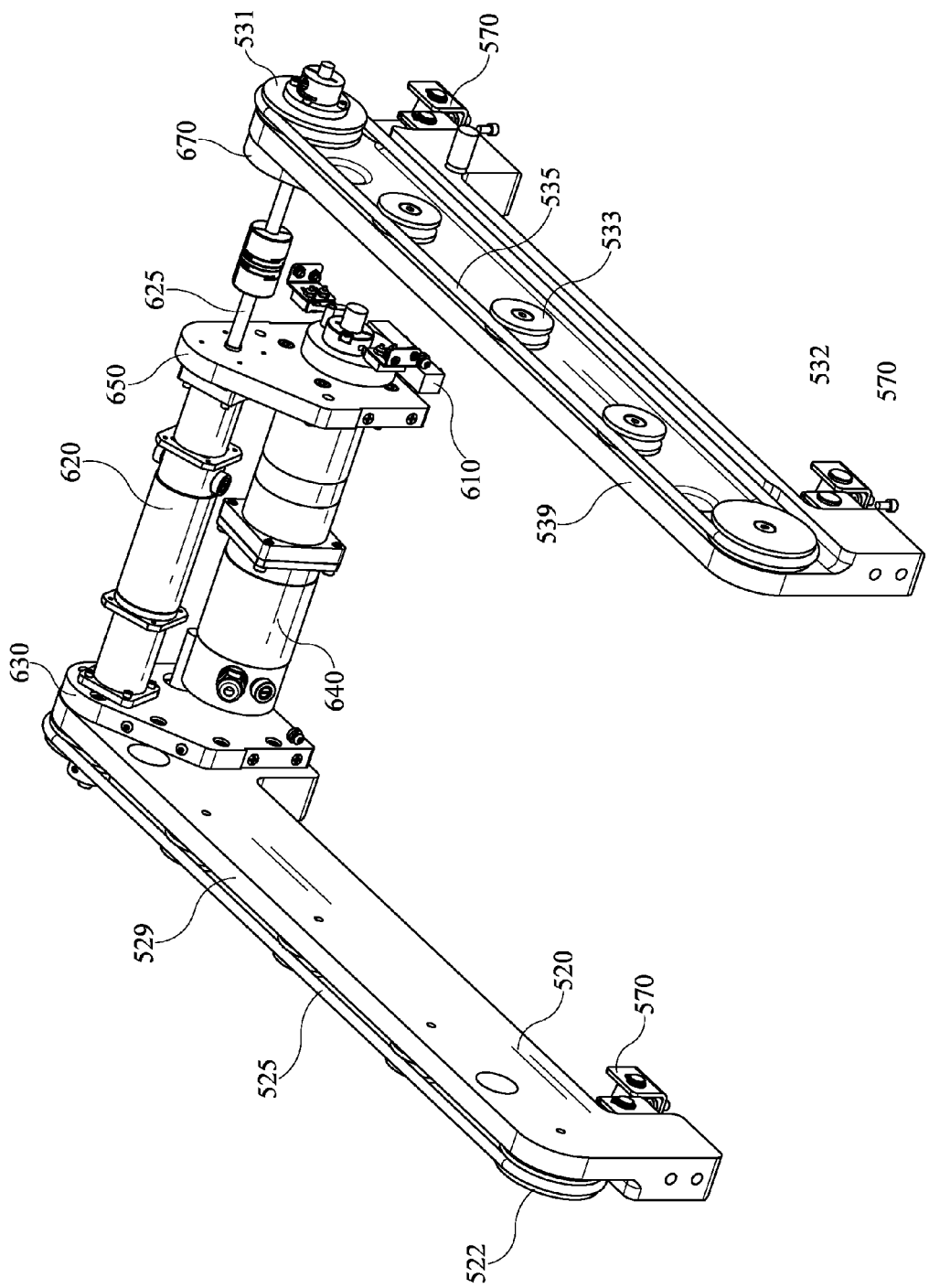
FIG. 6 is a perspective view of an embodiment of the popup conveyor, with an embodiment of the motor housing removed to show an embodiment of the popup conveyor motor and the popup lift motor.

Referring now to FIGS. 5 and 6, an illustration of a perspective view of an embodiment of the popup conveyor 500 is provided. The popup conveyor 500 may, in operation, be located at the exit conveyor 140 and/or the pre-wash station 700, and may be referred to as the exit popup conveyor 500E and the pre-wash popup conveyor 500P, respectively. FIGS. 5 and 6 illustrate this embodiment of the popup conveyor 500 having a first arm 520, a second arm 530, a first arm belt 525, a second arm belt 535, a second arm driver pulley 531, a second arm tail pulley 532, a second arm dummy pulley 533, a first arm tail pulley 522, a first arm top face 529, a second arm top face 539, and a plurality of mounting brackets 570. Although somewhat obscured from view by the first arm 520 and/or the first arm belt 525, this embodiment may include a first arm driver pulley, a first arm tail pulley, and a first arm dummy pulley, oriented similarly to the corresponding pulleys of the second arm 530. FIG. 5 illustrates an embodiment of a motor housing 510 that is absent from FIG. 6. FIG. 6 shows this embodiment without the motor housing to illustrate an embodiment of a popup conveyor motor 620, a popup lift motor 640, limiting switches 690, a popup conveyor motor axle 625, a first arm bracket 630, a central motor bracket 650, and a second arm bracket 670. In this embodiment, the popup conveyor 500 may be mounted or otherwise attached to the exit conveyor 140 and/or the pre-wash station 700 through the plurality of mounting brackets 570. The popup lift motor 640 may receive input from a controller and may also receive electrical power or other power to operate as desired. The popup lift motor 620 may rotate between two angular positions as determined by the location of the limiting switches 690. The popup lift conveyor motor 640 may have a home position and an extended position determined by the limiting switches 690. The popup lift motor 640 may be integral, attached, or otherwise affixed to a first arm bracket 630 and/or a central motor bracket 650 so that, while rotating from the home position to the extended position, the popup lift motor 640 may lift the some or all of the other components of the popup conveyor 500. In this way, the first arm belt 525 and the second arm belt 535 may be lifted or lowered, in some embodiments, to be above or below the top surface of the exit conveyor rollers 145 and/or the pre-wash conveyor rollers 705, and thus the first arm belt 525 and second arm belt 535 may be brought into direct contact with a dishwasher rack located at the exit conveyor 140 and/or the pre-wash station 700, respectively.

In the embodiment of the popup conveyor 500 illustrated in FIGS. 5 and 6, the popup conveyor motor 620 may be operatively connected to an input signal and/or a power source to be activated as desired. When activated, the popup conveyor motor 620 may rotationally drive the second arm driver pulley 531 and/or the first arm driver pulley (obscured by the first arm 520 and/or the first arm belt 525) either directly or through an axle, such as the popup conveyor axle 625. This rotational driving of the second arm driver pulley 531 will cause the second arm belt 535 to move in a direction consistent with the direction of rotation of the second arm driver pulley 531. The second arm tail pulley 532 and one or more second arm dummy pulleys 533 may be used to guide the second arm belt 535. In this way, the second arm belt 535 may frictionally transfer an object adjacent to the second arm belt 535 at or near the second arm top face 539. Substantially the same components and the same operation may optionally be employed to drive the first arm belt 525 as is used to drive the second arm belt 535. It is understood that, although it may be desirable to have the first arm 520 and the second arm 530 be substantially structurally the same or similar, the first arm 520 and the second arm 530 do not need to be the same or similar. Regarding FIGS. 5 and 6, it is understood that the exit conveyor 500E and the pre-wash conveyor 500P, while illustrated in this embodiment as utilizing substantially the same design and substantially the same structure, may be substantially different in design and/or structure. However, in some implementations it may be desirable to utilize the same or similar design and/or structure for exit popup conveyor 500E and pre-wash popup conveyor 500P for simplicity of manufacture, installation, maintenance, and/or achieving economies of scale.

FIG. 7 is an illustration of an exploded perspective view of an embodiment of the pre-wash station 700. This view illustrates an embodiment of the hood 710, the auxiliary side door 730, the queue side door 750, an external wall 770, a pre-wash frame 790, an auxiliary side elevator 735, a queue side elevator 755, a queue side door motor 720, an auxiliary side door motor 740, a door motor bracket 760, photo switches 780, a photo switch mounting bracket 782, switch holders 784, and a reflector 786. This view being an exploded view, the components are substantially oriented as they would be in this embodiment but are removed some distance from the location they would be in this embodiment if assembled. In this embodiment, the pre-wash frame 790 may stand on the ground, floor, or other surface and support the pre-wash station 700 at a desired height. In some embodiments, the external wall 770 may be integral with or attached to the pre-wash frame 790 and the door motor bracket 760 may be integral with or attached to the external wall 770. It is understood that other components may be introduced to support the door motor bracket 760; this embodiment merely illustrates one structure suitable for such support. The door motor bracket 760 may be sized to accept and have mounted thereto the auxiliary side door motor 740 and/or the queue side door motor 720. The auxiliary side door motor 740 and/or the queue side door motor 720 may be operatively connected to a control input and/or power source so that they may be activated as desired. The auxiliary side door motor 740 may have attached thereto an auxiliary door belt 745 that may wrapped around the auxiliary side door motor 740 thereby shortening the downward extension of the auxiliary door belt 745 from the auxiliary motor 740, or unwrapped from the auxiliary side door motor 740 thereby lengthening the downward extension of the auxiliary door belt 745 from the auxiliary side door motor 740. Similarly, the queue side door motor 720 may have attached thereto a queue door belt 725 that may be wrapped around the queue side door motor 720 thereby shortening the downward extension of the queue door belt 725 from the queue motor 720, or unwrapped from the queue side door motor 720 thereby lengthening the downward extension of the queue door belt 725 from the queue side door motor 720. The auxiliary door belt 745 may have at an end opposite the auxiliary side door motor 720 an auxiliary side elevator 735 that may be raised or allowed with the wrapping or unwrapping of the auxiliary door belt 745. The auxiliary side elevator 735 may be integral with, or attached to, the auxiliary side door 730. Thus, as the auxiliary side elevator 735 is raised or lowered, the auxiliary side door 730 is likewise raised or lowered. Similarly, the queue door belt 725 may have at an end opposite the queue side door motor 720 a queue side elevator 755 that may be raised or allowed with the wrapping or unwrapping of the queue door belt 725. The queue side elevator 755 may be integral with, or attached to, the queue side door 750. Thus, as the queue side elevator 755 is raised or lowered, the queue side door 750 is likewise raised or lowered. The auxiliary door motor 740 and the queue door motor 720 may be operated independently of the other so that, at any time, the auxiliary side door 730 and/or the queue side door 750 may be raised or lowered independent of the other.

FIG. 7 further illustrates this embodiment of the pre-wash station 700 having the hood 710 having one or more auxiliary door attachment grooves 713 and/or one or more queue door attachment grooves 715. The attachment grooves 713, 715 may slideably engage the auxiliary hood tongue 731 and/or the queue hood tongue, respectively. In this way, the auxiliary side door 730 and/or the queue side door 750 may be horizontally constrained but allowed to slide vertically with relation to the hood 710. Although not pictured in FIG. 7, in some embodiments the pre-wash station 700 may include a pre-wash conveyor having, among other things, pre-wash rollers 705 and pre-wash drive bands 707 (see FIG. 11). In these embodiments, the pre-wash frame 790, the external wall 770, the auxiliary side door 730 and the queue side door 750 may be sized and oriented to allow the pre-wash conveyor to fit inside, above the pre-wash frame 790. The photo switches 780 may be used to detect the presence of a dishwasher rack or other object within the pre-wash station 700. The photo switches 780 may then notify a controller of the dishwasher system 100 of the presence of a dishwasher rack or other object. The photo switches 780 may be held and/or mounted to other pre-wash station 700 structure by use of switch holders 784 and/or mounting brackets 782, in a desired location and/or locations. The reflectors 786 may interact with opposed photo switches 780 to selectively reflect light generated by the photo switches 780 back toward the photo switches 780. Based on signals from the photo switches 780, for example, a controller of the dishwasher system 100 may determine the position and/or location of the side doors 730, 750 as described below regarding FIGS. 8 and 9.

Referring now to FIGS. 8 and 9, these figures illustrate a perspective view of the embodiment of the pre-wash station 700 illustrated in FIG. 7. FIGS. 8 and 9 illustrate this embodiment in its partially assembled form. FIG. 8 illustrates the embodiment with the auxiliary side door 730 and the queue side door 750 in their lowered, or closed, positions. FIG. 9 illustrates the embodiment with the side doors 730, 750 in partially raised, or partially opened, positions. These figures illustrate the reflectors 786 as they might be located on the auxiliary side door 730. The reflectors 786 may reflect light back toward a photo switch 780 when they are aligned with the photo switch 780 to enable determination of the position of the side doors 730, 750 based on readings from one or more photo switches 780.

Figure 10:
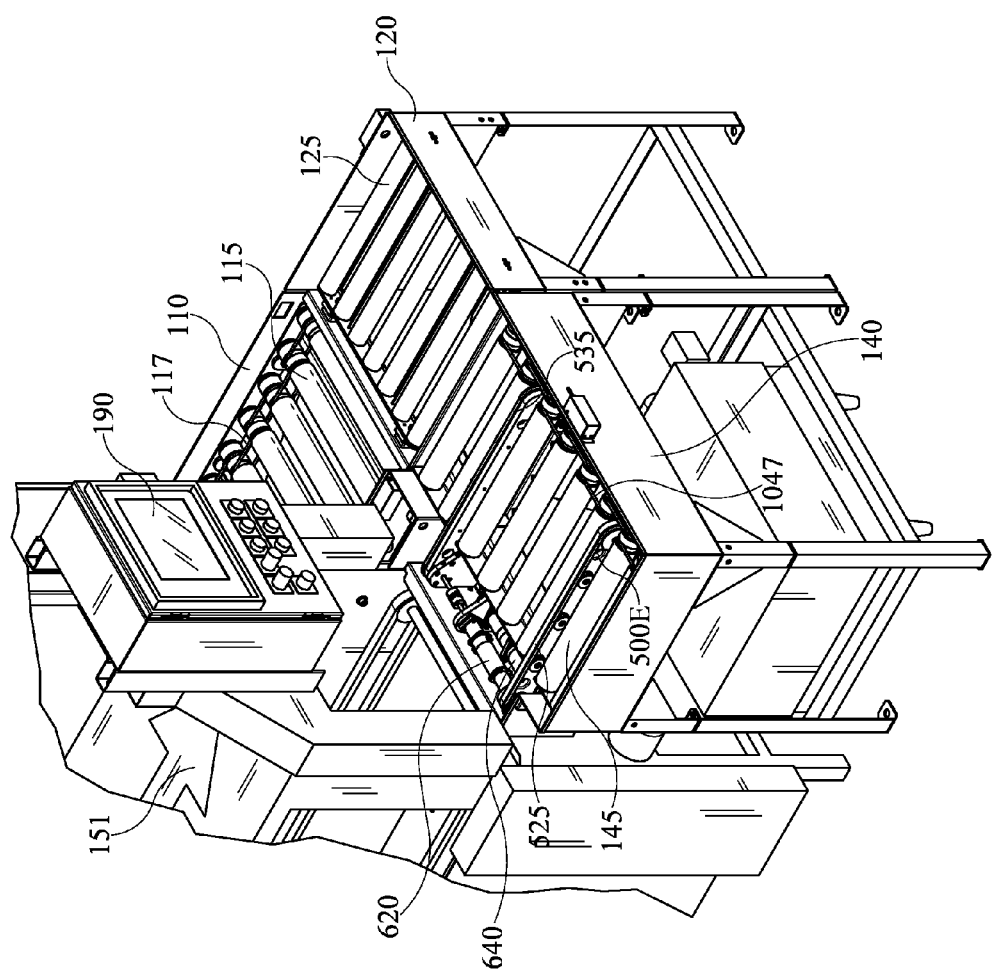
FIG. 10 is a front-right perspective view of an embodiment a portion of the dishwashing system, focusing on the exit conveyor and exit popup conveyor.

Referring now to FIG. 10, a perspective view of a portion of an embodiment of the dishwasher system 100, focusing on the exit conveyor 140 and exit popup conveyor 500E is illustrated. This view shows the exit popup conveyor 500E in its extended position so that a portion of the first arm belt 525 and a portion of the second arm belt 535 are above the upper most portion of the exit conveyor rollers 145. This view also illustrates exit conveyor drive bands 1047 that may transfer rotational power from one exit conveyor roller 145 to one or more other exit conveyor rollers 145. In this way, the exit popup conveyor 500E may assist a dishwasher rack in exiting the dishwasher 150. The exit popup conveyor 500E may then be returned to its home position wherein the first arm belt 525 and the second arm belt 535 are entirely below the top of the exit conveyor rollers 145, thus transferring the dishwasher rack from being supported by the exit popup conveyor 500E to the exit conveyor 140. The exit conveyor 140 may be rotationally powered by use of a motor and/or other power source and some or all of the exit conveyor rollers 145 may receive rotational power through the exit conveyor drive bands 1047. Thus, the exit conveyor may manually or automatically transfer a dishwasher rack or other object from the dishwasher 150 to the load rack 120.

Figure 11:
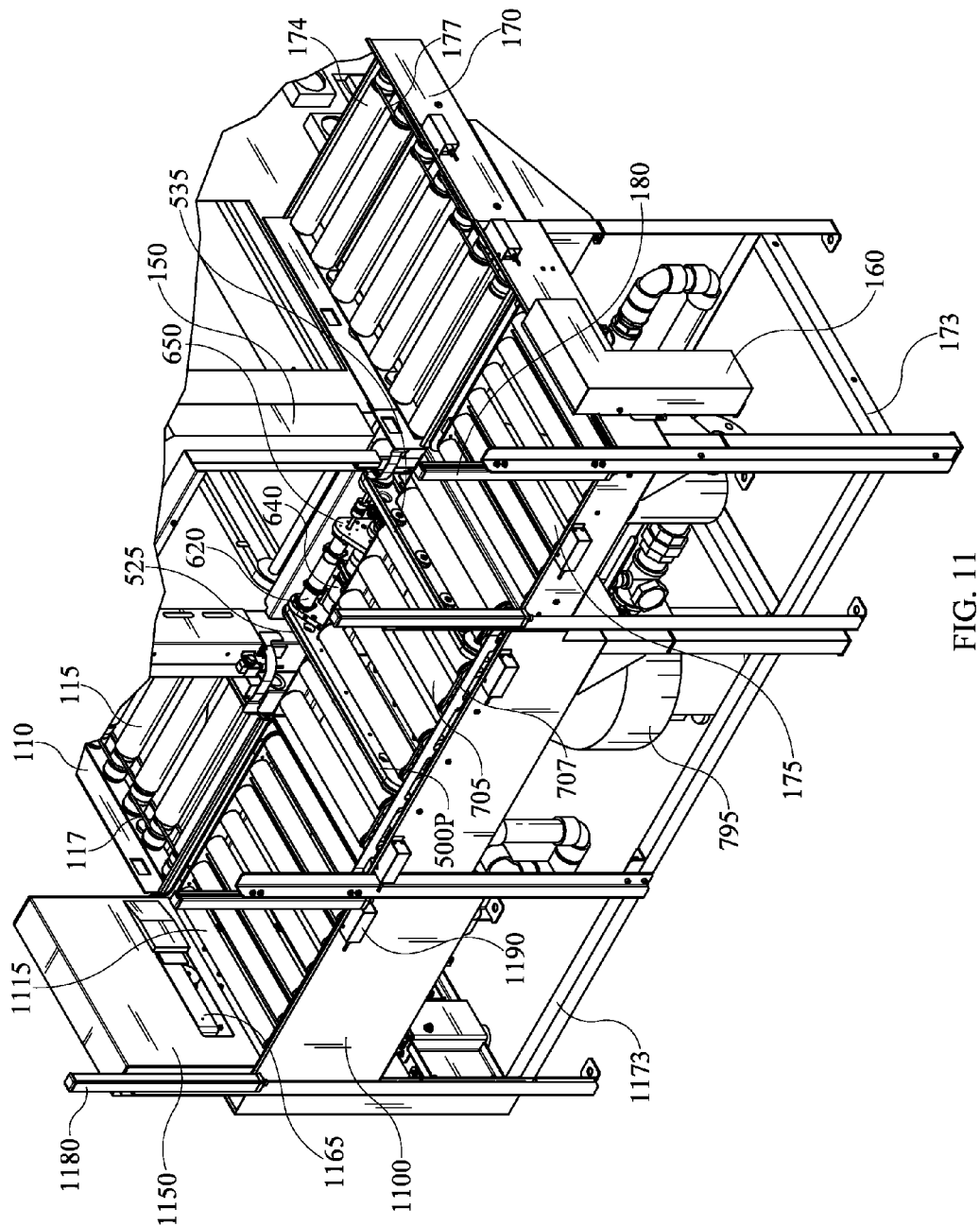
FIG. 11 is a front-left perspective view of an embodiment of a portion of the dishwashing system, focusing on an illustration of an embodiment of the pre-wash popup conveyor.
Figure 12:
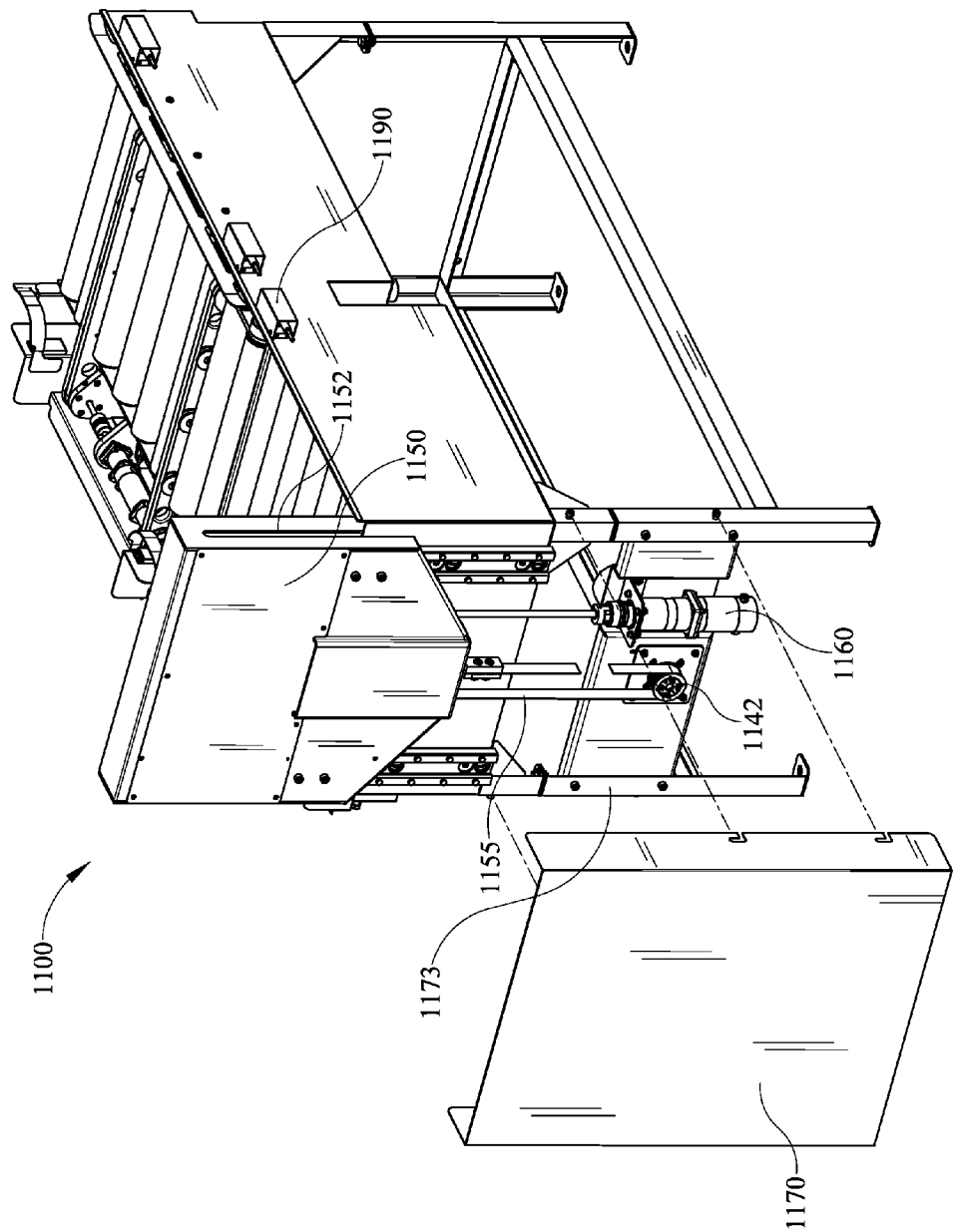
FIG. 12 is a rear-left perspective view of an embodiment of a portion of the dishwashing system, focusing on an illustration of an embodiment of the silverware soaking station.
Figure 13:
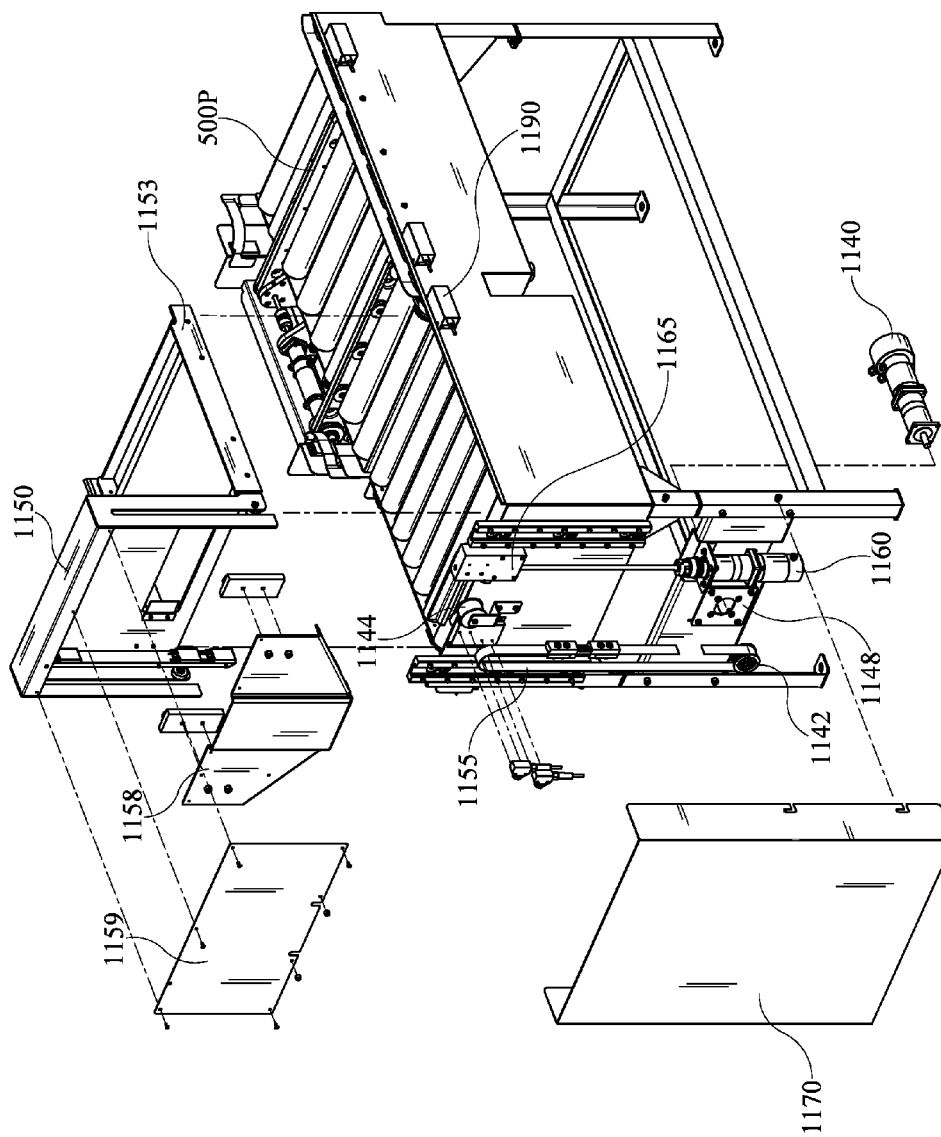
FIG. 13 is a rear-left exploded perspective view of an embodiment of a portion of the dishwashing system, focusing on an illustration of an embodiment of the silverware soaking station.

Referring now to FIGS. 11-13, these figures show various perspective views of a portion of the dishwasher system 100, focusing on a portion of the pre-wash station 700 and the silverware soaking station 1100. FIG. 11 is a front-left perspective view illustrating an embodiment of the silverware soaking station (SSS) 1100 having a SSS frame 1173, a SSS flipper 1165, a SSS light curtain 1180, a SSS occupancy switch 1190, and SSS rollers 1115. In this embodiment, the SSS frame 1173 may be used to support the SSS at a desired height. In some preferred embodiments, the SSS rollers may be substantially planar and stand at a height substantially equal to the height of the queue conveyor rollers 115 and the pre-wash station rollers 705. In this way, transfer of a dishwasher rack or other object having a substantially planar bottom surface from queue conveyor 110 to SSS 1110 and from SSS 1110 to pre-wash station 700 may be facilitated. The SSS elevator may be activated as desired to raise or lower the SSS rollers 1115, and consequently the dishwasher rack resting thereon into a soak tank 1130 (see FIG. 3) located directly below the SSS rollers 1115. The SSS rollers 1115 may be supported by a SSS conveyor support 1153 (see FIG. 13) to facilitate raising and lowering of the SSS rollers 1115. The occupancy switch 1190 may be used to detect and notify the dishwasher system 100 of the presence of a dishwasher rack so that desired actions may subsequently occur. The SSS elevator 1150 may be raised and/or lowered by a SSS elevator motor 1140 (see FIG. 13). The SSS elevator motor 1140 may be activated or not activated based on input from the GUI 190 (See FIG. 1) so that a dishwasher rack may be lowered and soaked at the SSS 1100 or not lowered and soaked at the SSS 1100 as desired. The SSS 1100 may contain the SSS flipper 1165 that may, while at rest, be substantially fully contained within the SSS elevator 1150 and, when activated, may extend outward to push a dishwasher rack or other object from the SSS 1100 to the pre-wash station 700. The SSS flipper 1165 may be powered by a SSS flipper motor 1160. In this way, the dishwasher rack may be transferred from the SSS 1100 to the pre-wash station 700 using substantially less power than may be needed if one or more of the SSS rollers 1115 were rotationally powered as they may be, for example, in the queue conveyor 110. The SSS light curtain 1180 may have opposed sending and receiving components facing one another as shown, for example, in FIG. 11. The SSS light curtain 1180 may send light from the sending component to the receiving component and may detect when the light sent is interrupted or breached. The SSS light curtain 1180 may send a signal to a controller indicative of an interruption or breach occurring. In this way, signals from the SSS light curtain 1180 may be used to determine the number of occurrences of breach, which may, if desired, be used to count the number of objects that have entered the SSS 1100. Thus, the SSS 1100 and its components may be activated as desired to, for example, lower or raise a dishwasher rack into the soak tank 1130 or activate the SSS flipper 1165.

FIG. 13 is an exploded perspective view of a portion of the dishwasher system 100, focusing on the SSS 1100 and the pre-wash popup conveyor 500P. The pre-wash popup conveyor 500P is illustrated in its extended position which, in some embodiments, may not occur until after a dishwasher rack is located above the pre-wash popup conveyor 500P. In some embodiments, it may not be desirable for the pre-wash popup conveyor 500P to be in its extended position before a dishwasher rack's entry into the pre-wash station 700 as the pre-wash popup conveyor 500P in the extended position may effectively block the transfer of the dishwasher rack to a position completely within the pre-wash station 700.

FIGS. 12 and 13 illustrate an embodiment of the SSS 1100 having an SSS elevator motor 1140, an SSS elevator mount bracket 1148, an SSS elevator drive pulley 1142, an SSS elevator belt 1155, an SSS elevator slot 1152, an SSS conveyor support 1153, SSS attachment plates 1158, 1159, and an SSS cover plate 1170. These views illustrate this embodiment having the SSS elevator motor 1140 attached to a lower portion of the SSS frame 1173 via the SSS elevator mount bracket 1148. In this embodiment, the SSS elevator drive pulley 1142 is integral with or attached to the SSS elevator motor 1140. The SSS elevator drive pulley 1142 may have a SSS elevator belt 1155 wrapped around it. In this way, the SSS elevator motor 1140 may drive the SSS elevator drive pulley 1142 which in turn may cause linear motion of the SSS elevator belt 1155. The SSS elevator belt 1155 may be attached to the SSS elevator 1150 so that when the SSS elevator belt 1155 is caused to move linearly, the SSS elevator 1150 is consequently raised or lowered, depending on the direction of rotation of the SSS elevator motor 1140. The SSS elevator 1150 may contain slots 1152 that may constrain the SSS elevator 1150 horizontally while allowing the SSS elevator to slideably engage the SSS frame 1173 in a vertical direction. In this way, the slots 1152 may guide the SSS elevator 1150 without overly inhibiting desired vertical linear motion. As discussed above, the SSS elevator 1150 may be attached to or integral with the SSS conveyor support 1153 so that the SSS conveyor support 1153 may support the SSS rollers 1115 and thereby raise and lower the SSS conveyor rollers 1115 with the SSS elevator 1150. The SSS attachment plates 1158, 1159 and the SSS cover plate 1170 may be attached together and also attached to the SSS elevator 1150 as illustrated in FIGS. 12 and 13 to protect the moving components of the SSS 1100 and/or to protect human operators that may be near the SSS 1100 during SSS elevator 1150 operation.

In some embodiments of a washing system, there may be provided, in any combination, some or all of the following: a load rack, a queue conveyor, a silverware soaking station, a pre-wash station, a pre-wash popup conveyor, an auxiliary conveyor, a washer, an exit conveyor, and an exit popup conveyor. The load rack may contain one or more rollers arranged to form a loader conveyor and the load rack may be supported by a loader frame so that the loader conveyor is substantially planar and standing at a first conveyor height. The first conveyor height may be a substantially fixed distance measured from the ground, floor, or other surface supporting the frame, to the center of the conveyor rollers. The load rack may be sized and shaped to support a dishwasher rack of a predetermined size and shape. The queue conveyor may be adjacent to the load rack, at a queue conveyor entry end. The queue conveyor may be sized and shaped to accept and transfer the dishwasher rack from the queue conveyor entry end to a queue conveyor exit end. The queue conveyor may contain one or more rollers arranged to form a continuous conveyor. The queue conveyor rollers may be oriented with axes transverse to axes of the loader conveyor rollers. In this way, the queue conveyor may transfer a dishwasher rack in a direction transverse to the direction of transfer of the loader conveyor. The queue conveyor may be supported by a queue frame so that the queue conveyor is substantially planar and standing at the first conveyor height. The queue conveyor rollers may be shaped to accept the dishwasher rack and powered to automatically transfer the dishwasher rack from the queue conveyor entry end to the queue conveyor exit end.

The silverware soaking station (SSS) may be adjacent to the queue conveyor exit end. The SSS may contain a SSS conveyor, a SSS soak tank, a SSS elevator, and/or a SSS light curtain. The SSS conveyor may be sized and shaped to accept and transfer the dishwasher rack from the queue conveyor exit end to a SSS conveyor exit end. The SSS conveyor may contain one or more rollers arranged to form a continuous conveyor. The SSS conveyor rollers may be oriented with axes transverse to the axes of the queue conveyor rollers. In this way, the SSS conveyor may transfer a dishwasher rack in a direction transverse to the direction of transfer of the queue conveyor. The SSS conveyor may be supported by a SSS conveyor support. The SSS conveyor support may be attached to a SSS elevator. The SSS station may be supported by a SSS frame. The SSS elevator may have an elevated position substantially equal to the first conveyor height and the SSS elevator may have a lowered position closer to the ground, floor, or other surface supporting the SSS frame. The SSS elevator may be used to lower a dishwasher rack into the SSS soak tank. The SSS soak tank may be filled with water and/or a silverware soaking solution. In this way, a dishwasher rack, when located at the SSS station, may be lowered from the first conveyor height into a silverware soaking solution used to clean silverware or other objects. The SSS elevator may then raise the dishwasher rack. The SSS may also contain a SSS flipper that may be powered by a SSS flipper motor. The SSS flipper may lie in a plane parallel to an outer wall of the SSS and may extend to transfer a dishwasher rack in the direction of rotation of the SSS conveyor rollers. In this way, a dishwasher rack may be transferred in a queue conveyor direction, be received from the queue conveyor exit end and transferred by the SSS flipper in a direction transverse to the queue conveyor direction to an exit end of the SSS conveyor. The SSS light curtain may contain a signal transmitter and a signal receiver. The SSS light curtain may detect when an object breaches a predetermined area. Thus, readings from the SSS light curtain may be used to determine (e.g. by a controller) how many objects have breached the area. A controller may then optionally cause a desired operation to be performed in response to such determination, including, but not limited to, sending information to a user interface and/or activating the SSS elevator motor. It is understood that other operations may be performed using the input from the SSS light curtain. Persons of ordinary skill in the art, having had the benefit of the present disclosure, will recognize and appreciate that additional and/or alternative operations may be performed using the input from the SSS light curtain and/or other sensors that may sense when silverware and/or other objects have been loaded into the SSS.

The pre-wash station may be adjacent to and downstream of the SSS. The pre-wash station may contain a pre-wash conveyor, a hood, an enclosure wall, a pre-wash frame, a SSS side door, an auxiliary side door, a SSS side door motor, an auxiliary side door motor, a SSS side door elevator, an auxiliary side door elevator, a spray nozzle, a sink, a garbage grinder, and/or a pre-wash popup conveyor. The pre-wash conveyor may contain one or more pre-wash conveyor rollers that are oriented substantially parallel to the SSS conveyor rollers. The pre-wash conveyor may be supported by a pre-wash frame so that the pre-wash conveyor is substantially planar and standing at the first conveyor height. The pre-wash conveyor rollers may be shaped to accept the dishwasher rack when received via the SSS conveyor and/or powered to automatically transfer the dishwasher rack from the SSS conveyor exit end until the dishwasher rack is fully contained within the pre-wash station. The hood may contain a top wall substantially parallel to the pre-wash conveyor and/or side walls substantially perpendicular to the top wall so that the side walls attach and/or are integral to the top wall and extend downward toward the pre-wash conveyor. The enclosure wall may attach or be integral to the top wall and extend downward to the pre-wash frame which may be used to support the pre-wash station. The SSS side door may attach and/or be integral to the hood and may extend downward to the pre-wash conveyor so that the SSS side door may isolate the SSS conveyor from the pre-wash conveyor. The enclosure wall may be substantially perpendicular to the SSS side door so that the enclosure wall does not impede movement of the dishwasher rack along the pre-wash and/or SSS conveyor. The SSS side door may slideably engage the hood and/or the enclosure wall and the SSS side door may be attached to the SSS side door elevator. The SSS side door elevator may raise the SSS side door into a SSS side door elevated position and the SSS side door elevator may lower the SSS side door into a SSS side door lowered position. The SSS side door elevator may be raised and/or lowered by a SSS side door elevator motor. In this way, the SSS side door may be raised to allow entry of a dishwasher rack from the SSS station into the pre-wash station or lowered to impede such entry and also, when lowered, the SSS side door may contain spray within the pre-wash station. The auxiliary side door may be located opposite the SSS side door and oriented parallel to the SSS side door. The auxiliary side door may optionally engage the hood and enclosure wall in substantially the same way as the SSS side door. Through application of an auxiliary side door elevator and an auxiliary side door elevator motor, the auxiliary side door may optionally be raised and lowered in substantially the same way as the SSS side door. The primary difference may be only that the auxiliary side door is located opposite the SSS side door and the auxiliary side door is located between the pre-wash station and the auxiliary conveyor. The auxiliary conveyor is discussed in more detail below. The pre-wash station may contain a spray nozzle capable of spraying water onto a dishwasher rack located within the pre-wash station. The spray nozzle may be capable of spraying high temperature and/or high pressure water or other liquid. The SSS side door and auxiliary side door may be lowered before the spray nozzle is activated to contain the spray within the pre-wash station. The pre-wash station may contain a sink, located below the pre-wash station conveyor, capable of collecting and directing any run-off fluid and/or debris from the pre-wash station. The sink may be formed to attach to a garbage grinder. The garbage grinder may be below the sink and may be used to grind down any relatively large particles, such as food particles, into a form that may flow out of a drain or pipe.

The pre-wash station may contain a popup conveyor capable of extending upward from under the pre-wash station conveyor to lift the dishwasher rack and transfer it in a direction transverse to the direction of travel along the pre-wash conveyor. The popup conveyor may attach to the pre-wash station or pre-wash station frame. The popup conveyor may contain a first arm, a second arm, a popup conveyor motor, a popup lift motor, a first arm driver pulley, a second arm driver pulley, a first arm tail pulley, a second arm tail pulley, a first arm belt, and/or a second arm belt. The first arm may contain a first arm top face and the second arm may contain a second arm top face. A portion of the first arm belt may run substantially parallel to the first arm top face and a portion of the second arm belt may run substantially parallel to the second arm top face. The first arm belt may wrap around the first arm driver pulley and the first arm tail pulley. The second arm belt may wrap around the second arm driver pulley and the second arm tail pulley. The first arm belt and second arm belt may run substantially parallel. The first arm driver pulley and the second arm driver pulley may be driven by the popup conveyor motor, which may be located between the first arm driver pulley and the second arm driver pulley. The popup lift motor may be attached to the popup conveyor. The popup conveyor may have a lowered position and an extended position. The popup lift motor may transfer the popup conveyor from the lowered position to the extended position or the popup lift motor may transfer the popup conveyor from the extended position to the lowered position. In the lowered position, the first arm top face and/or the second arm top face may be entirely below the pre-wash station roller conveyors. In the extended position, the first arm top face and/or the second arm top face may be above the pre-wash station conveyor rollers. In this way, the popup conveyor may extend upward so that the dishwasher rack rests on the first arm top face and the second arm top face and the dishwasher rack may be lifted above the pre-wash conveyor rollers until the dishwasher rack is no longer in gravitational contact with the pre-wash conveyor rollers. The popup conveyor motor can then be activated, thereby activating the first arm belt and/or the second arm belt to transfer the dishwasher rack in a direction transverse to the direction the dishwasher rack was traveling on the pre-wash conveyor rollers.

The auxiliary conveyor may be located on a side of the dishwashing system opposite the queue conveyor. The auxiliary conveyor may optionally be formed and operated in substantially the same way as the queue conveyor. The auxiliary conveyor may contain rollers, located at the first conveyor height, which may transfer a dishwasher rack in a direction parallel to the direction of travel of the queue conveyor rollers. However, instead of a SSS, the auxiliary conveyor also contains a second section containing rollers that may transfer a dishwasher rack in a direction transverse to the direction of travel on the remainder of the auxiliary conveyor. The second section of the auxiliary conveyor may contain an auxiliary flipper and/or an auxiliary flipper motor, optionally similar to the SSS flipper and/or the SSS flipper motor described above. In this way, a dishwasher rack may be placed on the auxiliary conveyor, transferred a distance in a first direction, and moved transversely to the first direction by a flipper into the pre-wash station. Thus, the pre-wash station may be loaded from either a SSS side or an auxiliary conveyor side.

The dishwasher may have an entry end adjacent to the pre-wash station. The dishwasher may contain a conveyor that operates in a direction substantially the same and collinear with the direction of operation of the popup conveyor, transferring a dishwasher rack from the dishwasher entry end to a dishwasher exit end. The dishwasher may have a longitudinal length, optionally collinear with the direction of operation of the dishwasher conveyor, which is optionally substantially the same as a longitudinal length of the queue conveyor. The longitudinal length of the queue conveyor may be collinear with the direction of conveyor operation of the queue conveyor. The dishwasher direction of operation and the queue conveyor direction of operation may be substantially parallel, but opposite. To save space, a side wall of the queue conveyor and a side wall of the dishwasher may be adjacent. The dishwasher may contain a detergent dispenser, a rinse aid dispenser, and/or other dispensers for use in dishwashing. An entry end of the exit conveyor may be adjacent to the dishwasher exit end. The exit conveyor may contain exit conveyor rollers located at the first conveyor height. The exit conveyor rollers may transfer a dishwasher rack in a direction transverse to the direction of operation of the dishwasher conveyor. The exit conveyor may have an exit end adjacent to the load rack. The exit conveyor may contain an exit popup conveyor that, while in its extended position, may operate to assist a dishwasher rack in exiting the dishwasher exit end. The exit conveyor may then lower thereby transferring the dishwasher rack to the exit conveyor rollers. The exit popup conveyor may optionally be substantially structurally and operationally the same as the pre-wash popup conveyor, described above.

In some embodiments, one or more controllers (e.g. a processor) may be used to operate the dishwashing system as desired. An interface may optionally be utilized so that a user may input parameters which may then be transferred into commands by the controllers for various operations of the dishwashing system. The interface may be, for example, but not limited to, a graphical user interface (GUI), a human machine interface (HMI), and/or other type of interface. For example, a user may input that a dishwasher rack is intended for silverware. In this example, if desired, the silverware soaking station may only be lowered into the soak tank if the user inputs the dishwasher rack as containing silverware. Thus, in this example, if the user input a dishwasher rack containing silverware, the silverware soaking station elevator motor may be activated when the dishwasher rack containing silverware arrived at the silverware soaking station. In this example, a dishwasher rack not containing silverware may optionally be allowed to skip the silverware soaking station soak tank. Similarly, other operations may be performed, or skipped, as desired and/or in accordance with given user inputs via the interface.

In some embodiments, the above-mentioned components may be used, individually or in any combination, to form one or more aspects of a dishwashing system. In some embodiments, a dishwasher rack may be placed on the load rack. The dishwasher rack may contain one or more pieces of dishware, silverware/flatware, and/or other items. The dishwasher rack may then be transferred manually, automatically, and/or otherwise, from the load rack onto the queue conveyor. The dishwasher rack may then be transferred along the queue conveyor manually, automatically, and/or otherwise to the silverware soaking station (SSS). The queue conveyor may automatically transfer the dishwasher rack by utilizing motorized queue conveyor rollers. One or more of the queue conveyor rollers may attach to a driving motor directly, by coupling, by belt, by chain, and/or otherwise. One or more of the queue conveyor rollers may receive power from an otherwise powered roller by being banded, belted, chained, or otherwise connected to the otherwise powered roller. The dishwasher rack may then be transferred onto the SSS. The dishwasher rack may then be lowered into the soak tank, if desired, and subsequently raised, if originally lowered. The dishwasher rack may then be pushed by the SSS flipper and rolled along the SSS conveyor rollers to the pre-wash station. Once fully within the pre-wash station, the pre-wash station SSS side door and/or the pre-wash station auxiliary side door may be lowered to enclose the dishwasher rack. The pre-wash popup conveyor may then be activated to raise and engage the dishwasher rack. The spray nozzle within the pre-wash station may be activated before, during, or after the popup conveyor engages the dishwasher rack, thus spraying the contents of the dishwasher rack and, ideally, removing any large particles, such as food particles, from the contents of the dishwasher rack. The popup conveyor may transfer the dishwasher rack transversely into the dishwasher. The dishwasher rack may be transferred through the dishwasher while being washed. The exit popup conveyor may raise to accept the dishwasher rack and pull the dishwasher rack into position above the exit conveyor. The exit popup conveyor may then lower the dishwasher rack onto the exit conveyor rollers. The exit conveyor rollers may then be active manually or automatically, to transfer the dishwasher rack back into its original position on the load rack. The cycle can then be repeated with another load (optionally while one or more additional loads are at other steps in the cycle).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A system for feeding washing racks to an entrance of a washer, comprising:
a directionally alternating transfer conveyor positioned at, and able to communicate said washing racks with, said entrance of said washer; said conveyor having a first receiving mode, a second receiving mode, and a discharge mode;
wherein in said first receiving mode said conveyor is transferringly driving in a first direction and wherein in said second receiving mode said conveyor is transferringly driving in a second direction opposite said first direction; and wherein in said discharge mode, said conveyor is transferringly driving in a third direction substantially perpendicular to said first direction and said second direction;

a pre-wash enclosure substantially surrounding said conveyor and including a first and second door, said first and said second door each actuable between an open position and a closed position; and a pre-wash selective water flow interior of said pre-wash enclosure and directed generally toward said conveyor;

wherein said first door is in said open position and said conveyor is in said first receiving mode at least when one of said washing racks is communicated to said conveyor in said first direction;

wherein said second door is in said open position and said conveyor is in said second receiving mode at least when one of said washing racks is communicated to said conveyor in said second direction; and wherein said first door and said second door are both in said closed position at least when one of said washing racks is within said pre-wash enclosure and said water flow is activated.

2. The system of claim 1, further comprising a silverware soaking station and an auxiliary conveyor, said conveyor interposed between said silverware soaking station and said auxiliary conveyor.

3. The system of claim 2, further comprising an actuable flipper arm movable between a retracted flipper position wherein said flipper arm is in non-interference with said silverware soaking station and an extended flipper position wherein said flipper arm is atop said silverware soaking station and more proximal said conveyor than it is in said retracted flipper position.

4. The system of claim 3, further comprising an actuable second flipper arm movable between a second retracted flipper position wherein said second flipper arm is in non-interference with said auxiliary conveyor and a second extended flipper position wherein said second flipper arm is atop said auxiliary conveyor and more proximal said conveyor than it is in said second retracted flipper position.

5. The system of claim 2, wherein said silverware soaking station includes a soaking tank and a roller platform movable between a transfer platform position substantially coplanar with said conveyor and a soaking platform position recessed into said soak tank and positionally below said transfer platform position.

6. The system of claim 5, further comprising an actuable flipper arm movable between a retracted flipper position wherein said flipper arm is in non-interference with said silverware soaking station and an extended flipper position wherein said flipper arm is atop said silverware soaking station and more proximal said conveyor then it is in said retracted flipper position.

7. The system of claim 6, further comprising a light curtain adjacent said silverware soaking station, said light curtain sensing passes of objects therethrough when said roller platform is in said soaking platform position.

8. The system of claim 7, wherein said platform moves from said soaking platform position to said transfer platform position after sensing of a predetermined number of object passes by said light curtain when said roller platform is in said soaking platform position.

9. The system of claim 2, wherein said conveyor includes a plurality of rollers rotationally driving selectively in said first direction and selectively in said second direction, and a plurality of first rotating belts rotationally driving selectively in said third direction, wherein said rotating belts are adjustable between a transferring position positionally above said rollers and a non-transferring position positionally below said rollers.

\* \* \* \* \*